United States Patent [19]

Steer

[11] Patent Number: 4,718,234
[45] Date of Patent: Jan. 12, 1988

[54] FAST FILL VALVING MECHANISM FOR A MASTER CYLINDER

[75] Inventor: John E. Steer, South Bend, Ind.
[73] Assignee: Allied Corporation, Morristown, N.J.
[21] Appl. No.: 900,644
[22] Filed: Aug. 26, 1986
[51] Int. Cl.[4] ............................................. B60T 11/20
[52] U.S. Cl. ........................................ 60/562; 60/578; 60/589
[58] Field of Search ................ 60/562, 574, 576, 578, 60/588, 589

[56] References Cited

U.S. PATENT DOCUMENTS

| | | | |
|---|---|---|---|
| 2,291,056 | 7/1942 | Pallady | 60/578 |
| 3,043,404 | 7/1962 | Peras et al. | 188/88 |
| 4,329,846 | 5/1982 | Gaiser | 60/578 |
| 4,474,005 | 10/1984 | Steer | 60/589 |
| 4,559,781 | 12/1985 | Steer et al. | 60/578 |

Primary Examiner—A. Michael Chambers
Attorney, Agent, or Firm—Larry J. Palguta; Ken C. Decker

[57] ABSTRACT

The master cylinder (10) comprises a housing (12) having a longitudinal bore (14), an end (24) enclosed by a bearing member (18) which retains a sleeve member (20) within the bore (14), a reservoir (70) mounted on the housing (12) and a pair of pistons (30, 40) slidably received within the bore (14), one piston (30) extending through the end (24) of the sleeve member (20). The one piston (30) has a reduced diameter end (32) which provides seating for a fast fill valving mechanism (110). The fast fill valving mechanism (110) comprises a fast fill seal (120) having a flexible arm (122) engaging an interior surface of the sleeve member (20) and the sleeve member (20) having longitudinal grooves (22) adjacent the arm (122), a fast fill spring member (140) trapped between the fast fill seal (120) and a land member (130), the land member (130) having pockets (132) covered by the fast fill spring member (140) and the pockets (132) communicating with passages (133) in the land member (130). The land member (130) engages a flexible seal (90) engaging an interior surface (23) of the sleeve member (20). Displacement of the one piston (30) within the bore (14) creates an increasing pressure which will, at a predetermined higher pressure, cause the fast fill spring member (140) to bow into the pockets (132) and permit fluid passage therearound and through the land member (130) to an auxiliary chamber (170) defined by the land member (130), flexible seal (90), and the sleeve member (20).

21 Claims, 7 Drawing Figures

FAST FILL VALVING MECHANISM FOR A MASTER CYLINDER

The present invention relates to a fast fill valving mechanism for a master cylinder, particularly a master cylinder which has a short length and compact structure.

Prior art master cylinders usually require an initial period of actuation that produces a hydraulic pressure and fluid displacement which places the wheel brakes in position for the initiation of braking. In other words, a certain amount of hydraulic fluid must be displaced by the master cylinder through the system in order to merely place the pistons and associated brake equipment in position for the initiation of braking. It is highly desirable to provide a master cylinder construction which when actuated effects a quick or "fast fill" of the associated brake lines and braking apparatuses so that the brakes are ready immediately for the commencement of braking. The result is a more quickly responsive braking system because the fast fill construction eliminates a longer brake pedal stroke necessary for effecting the displacement of fluid within the brake system. Prior master cylinder constructions providing for a "fast fill" of the braking system typically include a ball valve and other such devices. These structures are speed sensitive because a slow actuation of the brakes permits fluid leakage through the valving and thus fails to effectively accomplish the desired transmittal of brake fluid to the brake system. Also, these constructions typically cannot limit the fast fill function of the master cylinder so that at a given point in the actuation cycle the fast fill function is terminated. U.S. Pat. No. 4,559,781 illustrates a type of flexible seal for a master cylinder having a fast fill function. It is desirable to provide a fast fill mechanism for a short master cylinder which will provide solutions to the above problems and which will be easily assembled and cost less than prior fast fill master cylinder constructions.

The present invention comprises a master cylinder housing with a bore extending axially therein, a reservoir providing fluid for said bore, an end of said housing having a bearing member attached thereto and retaining a sleeve member within said bore, a pair of pistons associated with said master cylinder housing and one of said pistons extending through an opening in said bearing member, an end of said one piston having a fast fill seal, spring member, and land member disposed thereat between the end of the one piston and the sleeve member, the fast fill seal having a plurality of through openings and the seal engaging said land member, the land member having a plurality of pockets adjacent and communicating with respective through openings, the pockets having passage means, the spring member disposed between the fast fill seal and land member which is engaged by the fast fill seal, movement of said one piston effecting increased pressure within an associated pressure chamber of said master cylinder and causing said spring member to extend within the pockets at a predetermined pressure and allow pressure within said chamber to be communicated through said through openings, pockets and passage means.

One way of carrying out the invention is described in detail below with reference to the drawings which illustrate an embodiment in which.

FIGS. 4a–d illustrate progressively the operation of the fast fill valving mechanism from the fully released to rest position to venting effected during return to the released position.

Figure 1:
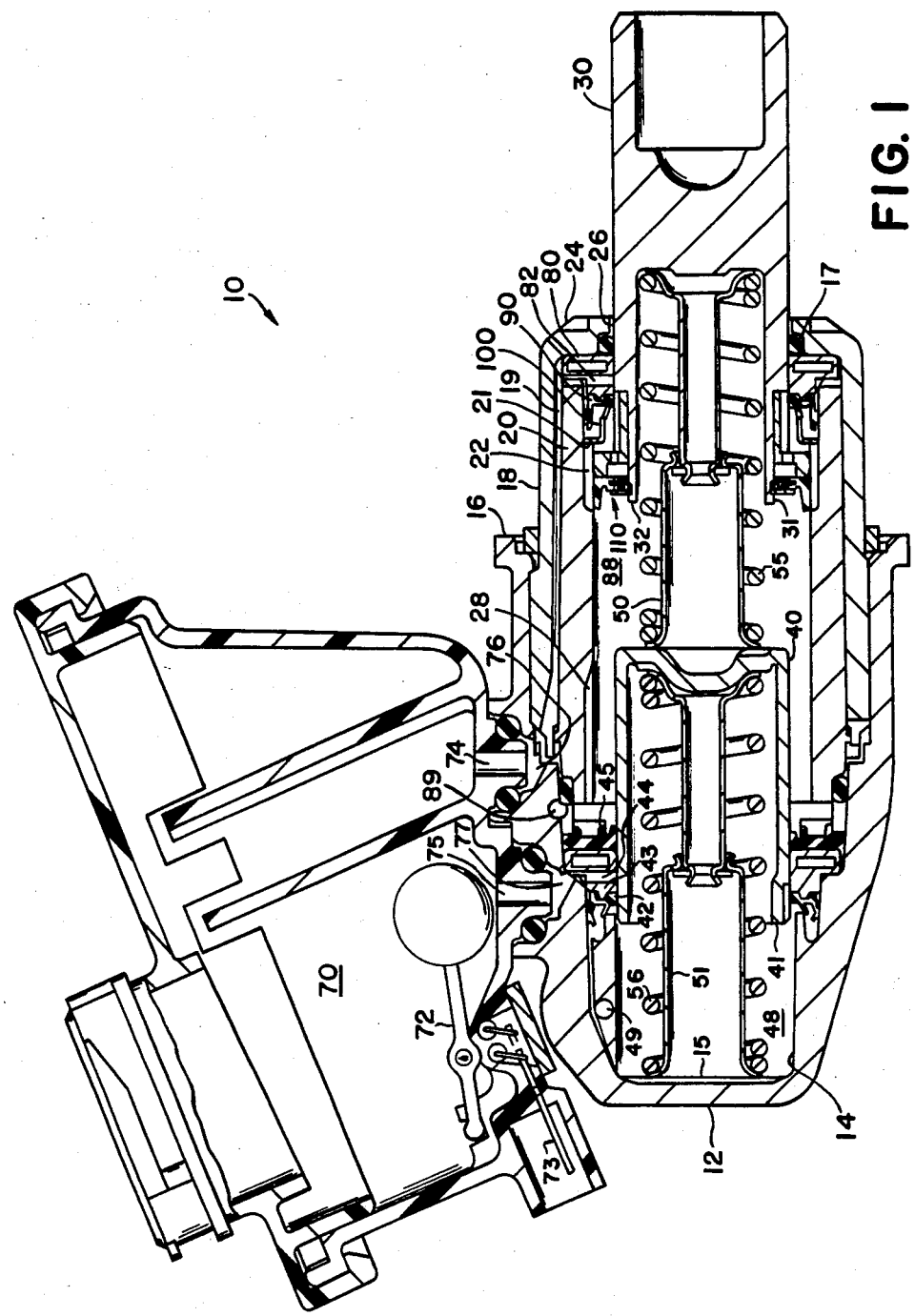
FIG. 1 is a section view of the master cylinder of the present invention.

The master cylinder of the present invention is designated generally by the reference numeral 10 in FIG. 1. Master cylinder 10 includes a housing 12 having therein a longitudinal bore 14 with an open end 16. Open end 16 threadably receives a bearing member 18 which positions a sleeve member 20 within the bore 14. Bearing member 18 extends radially inwardly at end 24 to provide an opening 26 through which extends a first or primary piston 30. First piston 30 is spaced-apart from second piston 40 by a top hat construction 50 which includes spring 55. Second piston 40 is spaced apart from bore end 15 by a top hat construction 51 which includes spring 56. A reservoir 70 is disposed atop and attached to the housing 12, and comprises a reservoir, fluid level lever 72 and sensor 73 that is described within which U.S. Pat. No. 4,630,443 issued 12/23/86, is incorporated herein by reference. The bearing member 18 includes a longitudinal groove or passageway 19 between the interior surface of the bearing member and sleeve member 20, as described previously in U.S. Pat. No. 4,474,005 incorporated herein by reference. Hydraulic fluid contained within reservoir 70 may communicate through reservoir opening 74, housing opening 76, and passageway 19. Reservoir opening 75 provides for hydraulic fluid communication to the bore 14 via a housing opening 77. Second piston 40 includes at an end 41 a flexible seal 42 which engages the interior surface of bore 14, a retainer 43 which includes a radial opening 44 communicating with housing opening 77 and reservoir opening 75, and a seal member 45 engaging the interior of bore 14. Bore 14, second piston 40, seal 42, retainer 43, and seal 45 define a second pressure chamber 48 which communicates with an outlet 49.

Figure 2:
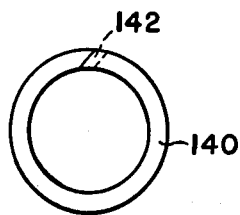
FIG. 2 is an illustration of the fast fill spring member.

Bearing member 18 is threadably engaged with housing end 16 and further includes a seal 17. The primary piston 30 includes a stepped-down or reduced diameter section 31 located at piston end 32. A retainer 80 is located between the bearing end 24 and piston 30, the retainer 80 having a radial opening 82 which communicates with passageway 19. Retainer 80 abuts and positions a flexible seal 90 which is maintained axially in place by a ring member 100. Ring member 100 abuts shoulders 21 of longitudinal grooves 22 disposed in sleeve 20. Thus, ring member 100 assists retainer 80 in positioning axially flexible seal 90 at end 24 of bearing member 18. Disposed on piston end 32 is a fast fill valving mechanism indicated generally by reference numeral 110. Fast fill valving mechanism 110 comprises a fast fill seal 120 which is an annular member having an annular flexible arm 122 and a plurality of through openings 123 (see FIG. 4a). Through openings 123 are aligned with openings 124 located within insert 125. Seal 120 abuts end 131 of land member 130. Land member 130 is a longitudinally extending annular member having a plurality of axial pockets 132 aligned with axial passages 133. The axial passages 133 are aligned with axial grooves 134. Trapped between the abutting seal 120 and land member 130 is fast fill spring member or resilient member 140 illustrated in FIG. 2. Fast fill spring member 140 comprises an annular member which has split ends that overlap one another at 142. Thus, the spring member is able to expand circumferentially without the ends separating from one another. the reduced diameter section 31 of piston 30 defines a shoulder 33 which cooperates with a retainer 150 snapped onto the end 32 of piston 30. Retainer 150 and shoulder 33 have positioned therebetween the fast fill seal 120, fast fill spring member 140 and land member 130. Land member 130, flexible seal 90, sleeve surface 23 and shoulder 21 of sleeve member 20 define an auxiliary chamber 170. When the master cylinder is in the released or unactuated position illustrated in FIG. 4a, the auxiliary chamber 170 is free to communicate with passageway 19 because hydraulic fluid may flow through axial grooves 134, around the interior diameter of flexible seal 90, past shoulder 33, through the slight separation between the interior diameter of retainer 80 and exterior surface of piston 30, and through the radial opening 82. Likewise, auxiliary chamber 170 communicates freely with a primary pressure chamber 88 defined by the rear portion of second piston 40, sleeve member 20, fast fill valving mechanism 110, and piston 30. Fluid may flow from chamber 88 past flexible arm 122 of seal 120, through groove 22 and around the end of the land member 130 to auxiliary chamber 170.

Figure 3:
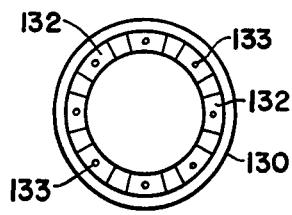
FIG. 3 is an end view of the land mechanism.

Referring to FIG. 3, land member 130 comprises a plurality of pockets 132 which communicate with the axial passages 133. When fast fill spring member 140 is disposed over pockets 132, the fast fill spring member effectively prevents fluid communication through openings 123 to pockets 132. The fast fill spring member is split to provide overlapping ends 142 which ensure continuous support for the fast fill seal 120 disposed over pockets 132. Fast fill seal 120 is maintained in place by the retainer part 150 which abuts insert 125. Retainer part 150 may comprise an integral part of end 32 of piston 30.

Figure 4A:
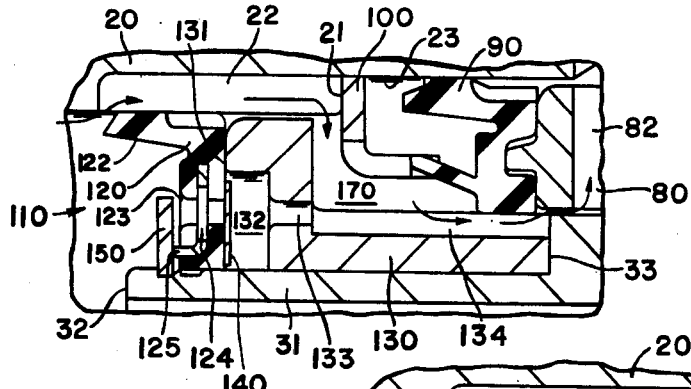
Figure 4B:
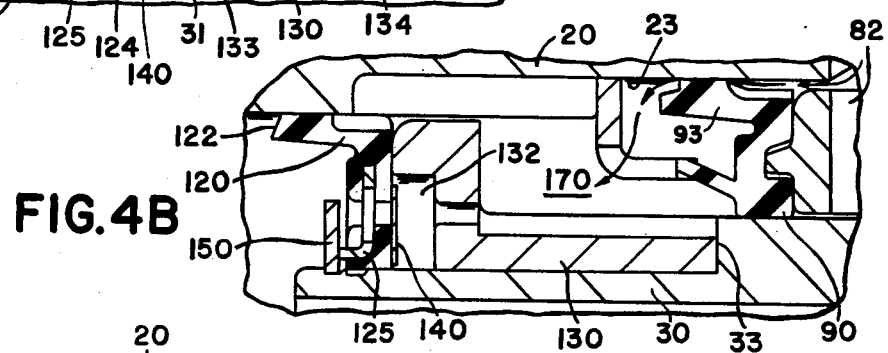
Figure 4C:
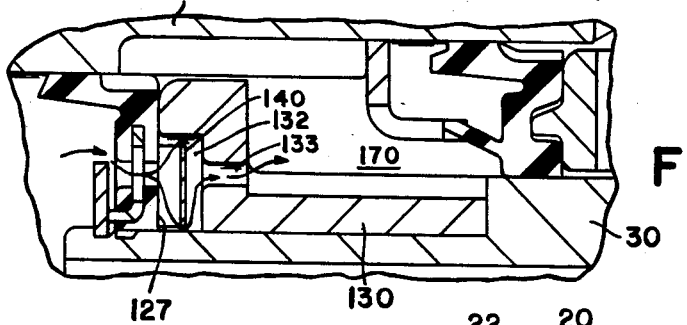

Master cylinder 10 operates according to the following steps: FIG. 4a illustrates the master cylinder in the at-rest position and also when the components thereof have returned to a fully released position at the end of a braking cycle. It should be noted that there is free communication and venting past flexible arm 122 through grooves 22 to chamber 170, through axial groove 134, and between the interior diameter of retainer 80 and exterior surface of piston 30 to radial opening 82. When a push rod (not shown) coupled with primary piston 30 is actuated in order to commence a braking cycle, piston 30 moves inwardly of bore 14 as illustrated in FIG. 4b. The shoulder 33 moves axially past the interior diameter of flexible seal 90 to close any compensation or venting flow through radial opening 82, and flexible arm 122 is displaced past grooves 22 to terminate fluid flow around arm 122. The effective piston pressure area is the outside diameter of the fast fill seal 120. Additional travel of piston 30 displaces a larger volume of hydraulic fluid than would be displaced normally by the outside diameter of piston 30. During the additional travel, the volume between the fast fill seal 120 and the flexible seal 90 increases, i.e. the volume of chamber 170 increases. Fluid is drawn into this chamber from the reservoir by means of the passage 19 and the pumping capability or inward radial movement of flexible arm 93 of seal 90. As illustrated in FIG. 4b, fluid flow follows the arrows into auxiliary chamber 170. Fluid cannot return to the reservoir 70 because the flexible arm 93 comprises a one-way valve which seals against the inside surface 23 of sleeve member 20. Therefore, during the actuation of the master cylinder, and regardless of the stroke rate of the pistons, there is no loss of fluid (in particular fast fill fluid volume) to the reservoir 70 as would occur with conventional master cylinders. Conventional master cylinders tend to be speed or application-rate sensitive because the fast fill fluid volume may leak back toward the reservoir and thus defeat the purpose of the fast fill mechanism. The present invention is not speed or application-rate sensitive. The pistons may be applied at a very slow rate and the fast fill valving mechanism will work effectively.

As the pressures increase within chambers 88 and 48 during actuation of pistons 30 and 40, fluid pressure in chamber 88 pushes fast fill spring member 140 away from surface 127 to seal 120 and into pockets 132. Thus, fluid pressure within chamber 88 is permitted to escape through openings 123, past the radial edges of fast fill spring 140, through pockets 132 and passages 133 to chamber 170 (see FIG. 4c). Once the fast fill procedure of the master cylinder has been accomplished, it is desirable to vent a portion of the fast fill fluid pressure because at a higher braking pressure it is desirable to keep the forces reacted to the brake pedal at a lower level. The pressure within chamber 170 will be less than the pressure within chamber 88 by an amount approximating the value of the fast fill relief pressure. Approximately 100 psi is the normal pressure utilized by current conventional fast fill master cylinders. This 100 psi is the pressure that will push or bow fast fill spring member 170 into the pockets 132 of land member 130 so that fluid within chamber 88 may flow to auxiliary chamber 170.

The present invention also provides a limitation to the extent the fast fill function may be effected. Sleeve member 20 has a longitudinal groove 28 which extends from an outlet port 89 toward the bearing member 18. When the piston 30 has been displaced to the extent that flexible arm 122 of seal 120 may enter into groove 28, seal 120 is no longer provides any sealing effect and the only pressure effected within chamber 88 is that which is effected by the outer diameter of piston 30. By reducing the effective area of piston 30 to only its outer diameter, pressure output to the brakes may be increased. At this point in the actuation of this master cylinder, the brake pedal is almost at a fully depressed position and it is desirable that the vehicle operator be able to effect as high a pressure as desired, and this is accomplished by reducing the effective area of piston 30 to only its outer diameter.

Figure 4D:
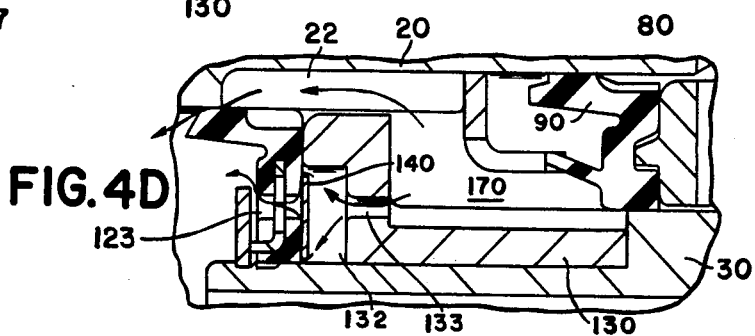

As the push rod (not shown) is released so that the pistons 40 and 30 may return toward their at-rest position illustrated in FIG. 4a, the volume of fluid contained between fast fill seal 120 and flexible seal 90 decreases as the volume of auxiliary chamber 170 decreases. At the same time, the volume of pressure chamber 88 is increasing. As illustrated in FIG. 4d, fluid may flow from auxiliary chamber 170 through longitudinal grooves 22 and past flexible arm 122 of seal 120, in addition to flowing through axial passages 133, pockets 132, and slightly around the radial ends of spring member 140 and through openings 123. When the respective components reach their at-rest position illustrated in FIG. 4a, all pressure is vented and any fast fill fluid excess is vented through the reservoir 70.

As is apparent from the above description, fast fill spring member 140 is a split ring which permits circumferential movement and axial deflection thereof. The relief pressure of approximately 100 psi is determined via the deflection rate of the fast fill spring member. The size of through openings 123 will affect the force which deflects the member 140. The hardness of seal 120 and the thickness of seal 120 between insert 125 and spring membre 140 will also affect the amount of deflection required for spring member 140 to separate from the surface 127 of seal 120.

Various modifications of the above-described embodiment of the invention will be apparent to those skilled in the art. It is to be understood that such modifications can be made without departing from the scope of the invention.

I claim:

1. A master cylinder, comprising a master cylinder housing with a bore extending axially therein, a reservoir providing fluid for said bore, an end of said housing having a bearing member attached thereto and retaining a sleeve member within said bore, a pair of pistons associated with said master cylinder housing and one of said pistons extending through an opening in said bearing member, an end of said one piston having a fast fill seal, spring member, and land member disposed thereat between the end of the one piston and the sleeve member, the fast fill seal having a plurality of through openings and the seal engaging said land member, the land member having a plurality of pockets adjacent and communicating with respective through openings, the land member having passage means, the spring member disposed between the fast fill seal and land member which is engaged by the fast fill seal, movement of said one piston effecting increased pressure within an associated pressure chamber of said master cylinder and causing said spring member to extend within the pockets at a predetermined pressure and allow pressure within said chamber to be communicated through said through openings, around the spring member, and through the pockets and passage means.

2. The master cylinder in accordance with claim 1, wherein the one piston includes a retainer part located fixedly at the end thereof, the retainer part maintaining the fast fill seal, spring member and land member in engagement with the end of said one piston.

3. The master cylinder in accordance with claim 1, wherein the other of said pistons has a retainer disposed thereabout, the retainer having a through opening permitting fluid communication with the reservoir.

4. The master cylinder in accordance with claim 1, wherein an end of the sleeve member has a longitudinal groove within an interior surface of the sleeve member, longitudinal movement of the one piston aligning the fast fill seal with the longitudinal groove and permitting fluid to flow past the fast fill seal.

5. The master cylinder in accordance with claim 1, wherein the land member is disposed between the end of said one piston and a flexible seal which engages a portion of an end of said sleeve member.

6. The master cylinder in accordance with claim 5, wherein a retainer is disposed between said bearing member and the end of said one piston, the retainer having an opening for communicating fluid therethrough.

7. The master cylinder in accordance with claim 6, wherein the bearing member and sleeve member include a longitudinal opening therebetween, the longitudinal opening permitting fluid communication between the associated pressure chamber and the reservoir via the opening of the retainer.

8. The master cylinder in accordance with claim 7, further comprising a ring member disposed within said sleeve member and about the end of the one piston, the ring member engaging a portion of said flexible seal.

9. The master cylinder in accordance with claim 8, wherein the end of the sleeve member includes a groove, one end of the groove being engaged by a flexible portion of said fast fill seal and the other end of the groove having a shoulder abutting the ring member.

10. The master cylinder in accordance with claim 5, wherein the land member comprises an annular member having a plurality of longitudinal grooves aligned with said passage means and pockets, the longitudinal grooves permitting fluid communication past said flexible seal member which is disposed about an end of said land member.

11. The master cylinder in accordance with claim 6, wherein the retainer abuts said flexible seal and maintains a stationary longitudinal position of said flexible seal member relative to the sleeve member.

12. The master cylinder in accordance with claim 6, wherein the end of the sleeve member, flexible seal, and land member define an auxiliary chamber.

13. The master cylinder in accordance with claim 12, wherein the passage means communicates fluid pressure between the pockets and auxiliary chamber.

14. The master cylinder in accordance with claim 12, wherein the fast fill seal includes an insert disposed therein, the insert having a plurality of openings aligned with the through openings of the fast fill seal.

15. A master cylinder comprising a housing having a longitudinal bore therein, a bearing member enclosing an open end of the housing and extending therefrom, a sleeve member disposed within said bore and maintained therein by the bearing member, a pair of pistons slidably disposed within said bore and one of the pistons engaged by an end of the bearing member which encloses the open end of said housing, a reservoir coupled with said housing for fluid communication therewith, the one piston having a reduced diameter portion of an end disposed interiorly of said bearing member, the end of the one piston having an abutment which positions fixedly a fast fill seal, fast fill spring member, and land member between the abutment and a shoulder at an opposite end of the reduced diameter portion, the fast fill seal comprising an annular member having a flexible portion extending into engagement with one end of the sleeve member, the fast fill seal having therein a reinforcement with a plurality of holes aligned with holes extending through said fast fill seal, the fast fill seal engaging an end of the land member which has a plurality of pockets aligned with passages extending through the land member, the fast fill spring member disposed between the fast fill seal and the end of the land member so as to enclose the pockets and prevent fluid communication through the holes to the pockets and passages of the land member, a flexible seal member disposed between an opposite end of the land member and the sleeve member so that the sleeve member, land member, and flexible seal member define an auxiliary chamber, displacement of the one piston inwardly of the housing effecting an increase in pressure in the housing and attainment of a predetermined pressure causing the fast fill spring member to bow inwardly into the respective pockets of the land member and permit fluid communication around the fast fill spring member, through the pockets and passages to the auxiliary chamber.

16. The master cylinder in accordance with claim 15, wherein the opposite end of the sleeve member includes a longitudinal groove within an interior surface of the sleeve member, longitudinal movement of the one piston to an extent that a portion of the fast fill seal displaces into the longitudinal groove permitting fluid within the housing to flow around the portion of the fast fill seal.

17. A master cylinder, comprising a master cylinder housing with a bore extending axially therein, a reservoir providing fluid for said bore, an end of said housing having a bearing member attached thereto and retaining a sleeve member within said bore, a pair of pistons associated with said master cylinder housing and one of said pistons extending through an opening in said bearing member, characterized in that a piston end of said one piston has a fast fill seal, resilient member, and land member disposed thereat between the piston end and sleeve member, the fast fill seal having through openings communicating with pockets in the land member, the pockets communicating with passages in the land member, the resilient member located between the fast fill seal and land member, displacement of the one piston effecting increased pressure within the bore and causing the resilient member to deform into the pockets at a predetermined pressure and permit pressure in the bore to be communicated through the through openings, around the resilient member, and through the pockets and passages.

18. The master cylinder in accordance with claim 17, wherein an end of the sleeve member has therein a longitudinal groove, displacement of the one piston moving the fast fill seal into alignment with the groove so that fluid may flow past the seal.

19. The master cylinder in accordance with claim 17, wherein the land member is disposed between the piston end and a flexible seal which engages said sleeve member.

20. The master cylinder in accordance with claim 19, wherein a retainer is disposed between the piston end and sleeve member, the retainer having a through opening permitting fluid communication therethrough.

21. A master cylinder having a pair of pistons movably disposed within a housing bore to generate fluid pressure within a pair of pressure chambers during braking, one of the pair of pistons at one end of the housing bore and cooperating with the other piston to define substantially one of the pair of pressure chambers, the other piston cooperating with the other end of the housing bore to define the other pressure chamber, characterized in that a piston end of the one piston has a fast fill seal, resilient member, and land member disposed thereat between the piston end and housing, the fast fill seal having through openings communicating with pockets in the land member, the pockets communicating with passages in the land member, the resilient member located between the fast fill seal and land member, displacement of the one piston effecting increased fluid pressure within the one pressure chamber and causing the resilient member to deform at a predetermined pressure and permit fluid pressure in the one chamber to be communicated through the through openings, past the resilient member, and through the pockets and passages.

* * * * *